United States Patent
Wang et al.

(10) Patent No.: US 6,844,909 B2
(45) Date of Patent: Jan. 18, 2005

(54) FERRODIELECTRIC LIQUID CRYSTAL DISPLAY (FLCD) MANUFACTURING METHOD

(75) Inventors: Jong-min Wang, Seoul (KR); Chang-ju Kim, Gyunggi-do (KR)

(73) Assignee: Samsung Electronics Co., Ltd., Gyunggi-Do (KR)

( * ) Notice: Subject to any disclaimer, the term of this patent is extended or adjusted under 35 U.S.C. 154(b) by 34 days.

(21) Appl. No.: 10/403,521

(22) Filed: Apr. 1, 2003

(65) Prior Publication Data

US 2004/0008315 A1 Jan. 15, 2004

(30) Foreign Application Priority Data

Apr. 2, 2002 (JP) ...................................... 2002-0018086

(51) Int. Cl.⁷ ................................................ G02F 1/13
(52) U.S. Cl. ....................... 349/188; 349/88; 349/172; 349/187
(58) Field of Search .......................... 349/85, 172, 184, 349/187, 188

(56) References Cited

U.S. PATENT DOCUMENTS 6,344,889 B1 * 2/2002 Hasegawa et al. .......... 349/129
6,545,738 B2 * 4/2003 Son et al. ................... 349/172

* cited by examiner

Primary Examiner—Dung T. Nguyen
Assistant Examiner—Michael H Caley
(74) Attorney, Agent, or Firm—Sughrue Mion, PLLC

(57) ABSTRACT

A method of manufacturing a ferrodielectric liquid crystal display device includes the steps of injecting melted ferrodielectric liquid crystal in a cell formed between a lower structure body and an upper structure body each having a substrate, an electrode layer, and an orientation film and sealing the cell; cooling to obtain phase transitions of the ferrodielectric liquid crystal corresponding to a bookshelf structure; applying dc potentials to the electrode layers at temperature ranging from temperatures higher than phase transition temperatures to temperatures lower than phase transition temperatures, stopping the dc potential applications and cooling until below a predetermined temperature, and applying a reverse potential to the electrode layers and cooling again. The ferrodielectric liquid crystal display device produced by such a manufacturing method can display clear black-and-white states with the liquid crystal layers having a mono domain of the bookshelf structure.

5 Claims, 6 Drawing Sheets

FERRODIELECTRIC LIQUID CRYSTAL DISPLAY (FLCD) MANUFACTURING METHOD

BACKGROUND OF THE INVENTION

1. Field of the Invention

The present invention relates to an ferrodielectric liquid crystal display (FLCD) manufacturing method and, more particularly, to an FLCD manufacturing method capable of forming a ferrodielectric crystal in a uniform mono domain upon a bookshelf-structured crystalization to enhance image quality.

The present application is based on Korean Patent Application No. 2002-18086 filed on Apr. 2, 2002, which is incorporated herein by reference in its entirety.

2. Description of the Prior Art

The LCD is a flat-type display device use of which is wide spread. The LCD is used mainly for portable devices and is also replacing conventional cathode-ray tubes (CRTs) in the field of large-sized display devices with the developments of display-enlarging technologies.

There exist various kinds of crystal materials applied to form the LCD.

The twisted nematic (hereinafter referred to as "TN") LCD employed a lot in general applications uses the interactions between the dielectric anisotropy of the TN liquid crystal molecules and the electric field to slow down a response time in tens of miliseconds (ms) so that it has difficulties in displaying animations, has a narrow visual angle, and generates cross-talk among pixels within a certain distance, to thereby cause a problem of difficulties in reducing a pixel size below a certain size.

Meanwhile, the FLCD uses the interactions between spontaneous polarization of the ferrodielectric liquid crystal and the electric field and provides rapid response characteristics below 1 ms. Such an FLCD, as a next generation display device, has no difficulties in displaying animations, is capable of providing a wide visual angle, and can implement a high resolution with a more reduced pixel size preventing cross-talk from occurring due to strong interactions between molecules, so that research into the FLCD is actively progressing.

For the ferrodielectric liquid crystal widely employed at present, there is a chiral smectic C phase (SmC*) liquid crystal material having bistable characteristics and a chevron structure.

For the FLCD using the liquid crystal material, in the manufacturing process, crystal maintained at a temperature over the melting point is injected in a cell between the substrates, the crystal turns to its smectic A phase having a layer structure perpendicular to the rubbing direction via a chiral nematic (N*) phase when the temperature is lowered down, and then turns to the chiral smectic C phase. In the process, the molecular long axes of liquid crystal molecules in the liquid crystal layer is tilted at a particular angle to the rubbing direction to decrease a distance between smectic layers, as a result of which the bent of the smectic layer is induced in the liquid crystal layer to compensate a volume change. Such a bent layer structure is referred to as a chevron structure, and a domain having different long axis directions of the liquid crystal based on the bent direction is formed, and on the interface of which non-uniform orientations having zigzag defects, hairpin defects, mountain defects, and so on are obtained.

A contrast ratio of an LCD is remarkably deteriorated with such orientation characteristics, and, if a dc voltage is forced to be applied against it, ions in the liquid crystal layer are stacked up or absorbed on the surface of an orientation film to cause a problem that produces a residual image phenomenon faintly displaying a preceding image pattern as one display is changed to the next one.

Besides, research is actively being carried out on ferrodielectric liquid crystal materials which provide an anti-ferrodielectric liquid crystal (AFLC) mode alleviating a threshold limitation, but its spontaneous polarization is more than 100 nC/cm$^2$ so that a residual image may also occur due to ion movements caused by an inverse polarization electric field. Further, in case of applying the active matrix driving approach which is an approach for each pixel to independently drive a liquid crystal by using thin film transistors (TFTs), leakage currents may occur owing to big spontaneous polarizations. Capacitors should be very large in capacity in order to restrain the leakage current of the AFLC, which reduces an aperture ratio to cause a problem of difficulties in using the AFLC as a display device.

In order to improve the drawback to such a ferrodielectric liquid crystal, ferrodielectric liquid substances have been continuously developed which have a bookshelf structure enabling alternate current driving and restraining residual images.

There is a crystal substance, as a ferrodielectric liquid crystal substance having the bookshelf structure in the spotlight at present, which has skipped the smectic A phase in the crystalization process. That is, in the crystalization process, the phase transition for the crystalization is undergone from an isotropic fluid state to a chiral nematic (N*) phase to a chiral smectic C (SmC*) phase. Of the liquid crystals transiting phases from the chiral nematic phase to the chiral smectic C phase, there is a half-V type liquid crystal having a monostable characteristic.

Figure 1:
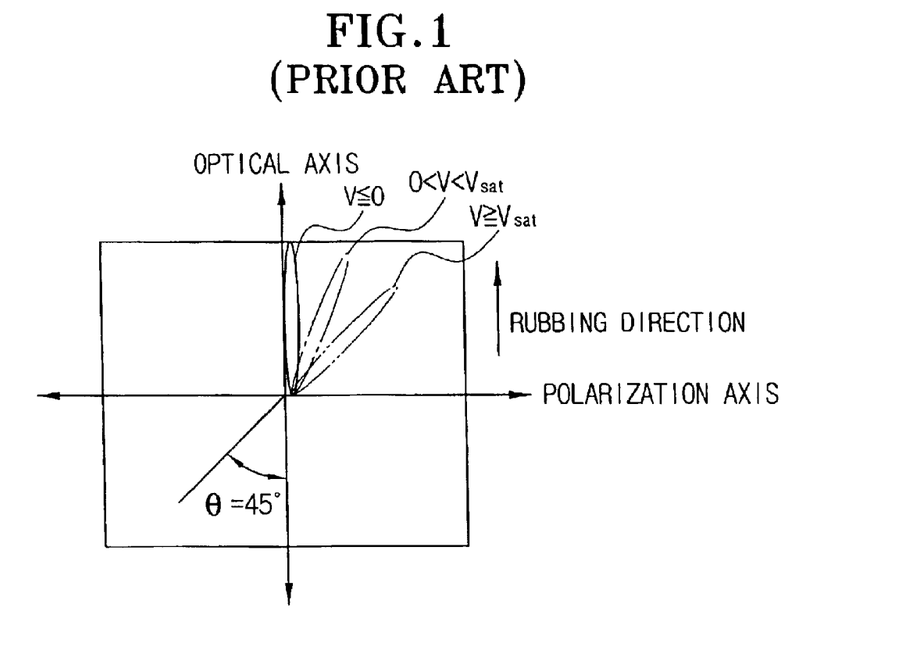
FIG. 1 is a view for showing a tilting phenomenon based on a voltage application to a half-V type ferrodielectric liquid crystal having a general bookshelf structure.

In the half-V type liquid crystal, the optical axis is positioned in a parallel direction with a rubbing direction of the orientation film when any electric potential is not applied, as shown in FIG. 1, and, when a positive voltage (+) is applied, the long axis of the liquid crystal is tilted up to 45 degrees at maximum in correspondence with a level of the electric potential applied. In FIG. 1, Vsat denotes a saturation voltage which produces a maximum tilt for the liquid crystal.

Figure 2:
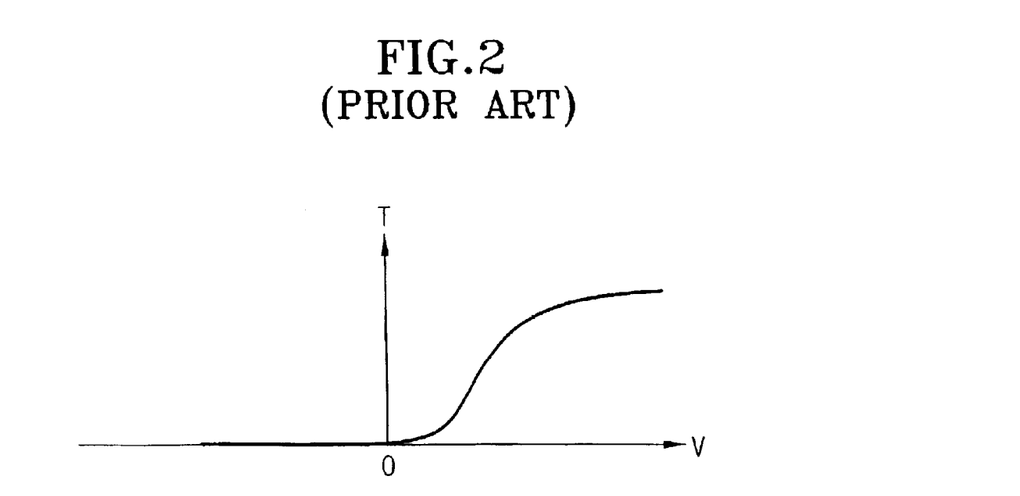
FIG. 2 is a graph for showing a relationship between an applied voltage and a light transmittance of the half-V type dielectric liquid crystal of FIG. 1.

Further, with an application of a negative voltage, the long axis of the liquid crystal is aligned in the same direction as when no potential is applied. The light transmittance of such a liquid crystal has a relationship as shown in FIG. 2, that is, a monostable characteristic with respect to an applied voltage. The liquid crystal having such a characteristic has several names, but is generally referred to as a half-V type liquid crystal, particularly considering the applied potential (V)-to-light transmittance (T) characteristic.

In particular, such a liquid crystal enables alternative current driving and analog gray scale displays for easy full-color implementations, and enables pulse driving due to the monostable characteristic, to thereby have an advantage of providing a display performance close to the existing CRT display.

However, the FLCD of the bookshelf structure which is manufactured with the conventional cooling has layer contractions occurring during the increase of a tilt angle of liquid crystal molecules when in the phase transition from the chiral nematic phase to the chiral smectic C phase in a process of the crystalization of liquid crystal, causing a problem of forming non-uniform domains in an alignment process of liquid crystal for compensating the layer contraction so that bright differences are brought out in a display state.

SUMMARY OF THE INVENTION

The present invention has been devised to solve the above problems, so it is an aspect of the present invention to provide a method of manufacturing an FLCD.

A method consistent with the present invention relates to a method of manufacturing an FLCD comprising the steps of forming a lower structure body and an upper structure body each having a substrate, a electrode layer, and an orientation film; forming a cell between the lower and upper structure bodies; injecting in the cell a predetermined ferrodielectric liquid crystal in a melted state and sealing the cell; cooling to obtain phase transitions of the ferrodielectric liquid crystal corresponding to a bookshelf structure; applying a predetermined first dc potential to the electrode layers at temperatures ranging from a first temperature higher than a temperature of the phase transitions to a second temperature below a temperature of the phase transitions; stopping the application of the first dc potential and cooling to a third temperature lower than the second temperature; and applying to the electrode layers a second dc potential having a polarity opposite to the first dc potential and cooling to a fourth temperature lower than the third temperature.

The ferrodielectric liquid crystal is a substance transiting phases from a chiral nematic phase to a chiral smectic C phase upon cooling.

Preferably, but not necessarily, the first temperature is a temperature at least 2 degrees centigrade (° C.) higher than the temperature of the phase transitions of the ferrodielectric liquid crystal, and the second temperature is a temperature at least 1 degree lower than the temperature of the phase transitions.

The third temperature is at least 1 to 2° C. lower than the second temperature, and the fourth temperature is at least 10° C. lower than the third temperature.

BRIEF DESCRIPTION OF THE DRAWINGS

The above aspect and other features of the present invention will become more apparent by describing in detail an illustrative, non-limiting embodiment thereof with reference to the attached drawings, in which.

DESCRIPTION OF THE ILLUSTRATIVE, NON-LIMITING EMBODIMENTS

Figure 3:
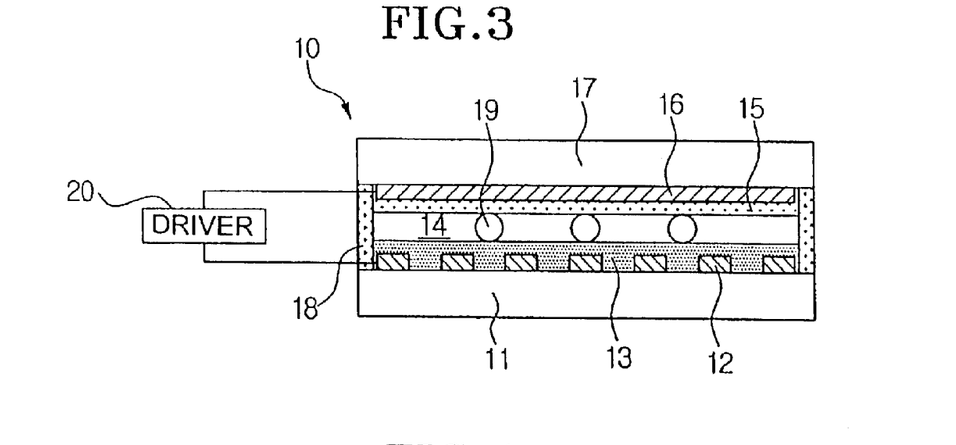
FIG. 3 is a cross-sectioned view for showing an FLCD according to an exemplary embodiment of the present invention.

FIG. 3 is a cross-sectioned view for showing an FLCD according to an illustrative, non-limiting embodiment of the present invention.

Referring to FIG. 3, an FLCD 10 has a lower substrate 11, a lower electrode layer 12, a lower orientation film 13, a liquid crystal layer 14, an upper orientation film 15, an upper electrode layer 16, an upper substrate 17, a sealing member or cell 18, and a spacer 19. Disposed on the bottom of the lower substrate 11 and the top of the upper substrate 17 are polarization plates (not shown) arranged for polarization axes to be crossed at a predetermined angle. A reference number 20 denotes a driver for applying a dc potential by varying polarity in a process of crystalizing a ferrodielectric liquid crystal injected in the liquid crystal layer 14.

A transparent substance such as glass or transparent synthetic resin is employed for the lower and upper substrates 11 and 17.

The lower and upper electrode layers 12 and 16 are formed with a known transparent conductive substance such as an indium tin oxide (ITO) material. Preferably, but not necessarily, the lower electrode layer 12 and the upper electrode layer 16 are provided with a plurality of electrodes formed side by side along a direction perpendicular to each other.

The lower and upper orientation films 13 and 15 are formed with diverse orientation materials which are known. Examples for the orientation materials may be polyimide, polyvinyl alcohol (PVA), nylon, PVA series, and so on.

The orientation films 13 and 15 are rubbing-processed at a predetermined angle with a rubbing material such as fabric.

The spacer 19 is mounted to maintain evenly a gap of the liquid crystal layer 14.

The liquid crystal layer 14 is filled with a ferrodielectric liquid crystal substance having the bookshelf structure and the mono stable characteristic which are produced through a crystalization process according to the present invention.

The ferrodielectric liquid crystal layer 14 having the bookshelf structure and the monostable characteristic has a structure in that liquid crystal molecules in a smectic layer, which are arranged to be vertical on a mono domain uniformly formed through the crystalization process, are in rows side by side without bent. Such an FLCD having the uniform mono domain of the bookshelf structure obtains a configuration of a structure having the uniform mono domain in a process injecting the liquid crystal at an isotropic state and applying a potential while cooling, as will be explained below.

The liquid substance having the bookshelf structure, that is, the liquid substance transiting phases from the chiral nematic (N*) phase to the chiral smectic C (SmC*) phase is diversely known in Japanese Patent Laid Open No. HEISEI 6-122875, 6-25060, 6-40985, 6-228057, U.S. Pat. No. 4,585,575, Republic of Korea Patent Laid Open No. 1997-1332, and so on.

Figure 5:
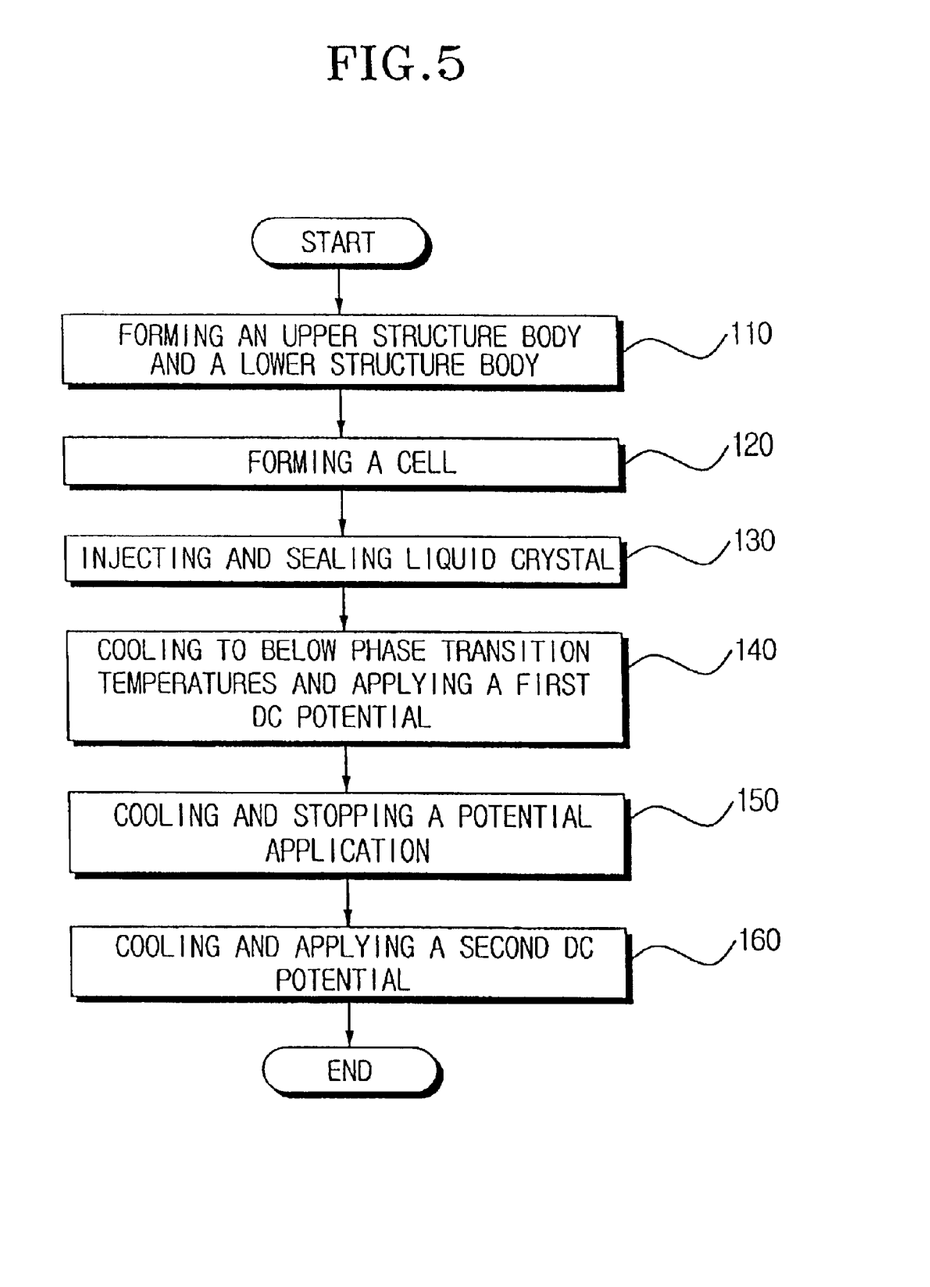
FIG. 5 is a flow chart for showing a process of manufacturing an FLCD device according to an exemplary embodiment of the present invention.

Hereinafter, a process of manufacturing an FLCD according to the present invention will be described with reference to FIG. 3 and FIG. 5.

First, lower and upper structure bodies are formed (Step 10).

The lower structure body refers to a structure formed in order of the lower substrate 11, lower electrode layer 12, and lower orientation film 13, and the upper structure body refers to a structure formed in order of the upper substrate 17, upper electrode layer 16, and upper orientation film 15. The lower orientation film 13 and the upper orientation film 15 are rubbing-processed along a set direction, respectively, with a known rubbing material such as a roller covered with fabric.

Next, a cell 18 for a liquid crystal injection is formed between the rubbing-processed lower and upper structure bodies (Step 120).

Figure 4:
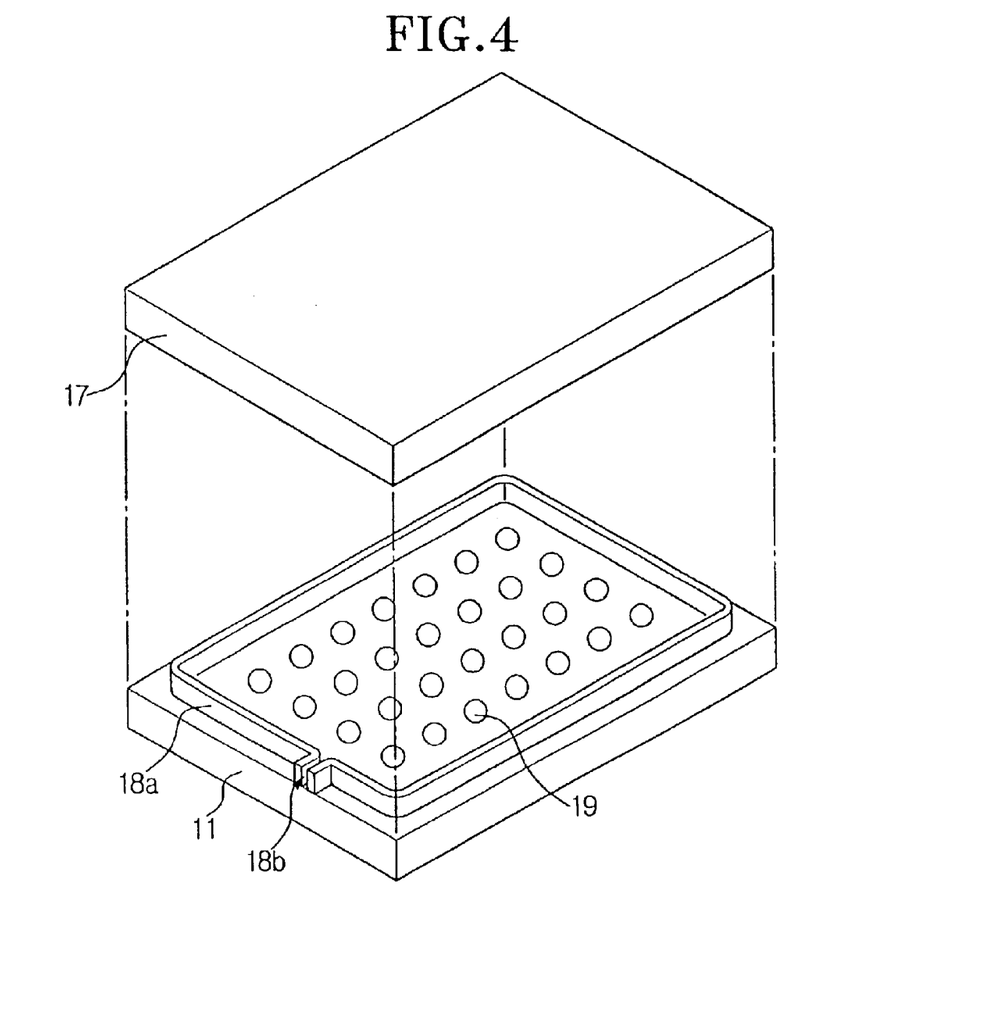
FIG. 4 is a perspective view for showing an example of a process of forming a cell for liquid crystal injections in the liquid crystal display device of FIG. 3.

As an example for a cell-forming process, in either of the rubbing-processed lower and upper structure bodies, the cell 18 is formed corresponding to a pattern to be formed with a sealing material such as a sealant. That is, as shown in FIG. 4, the cell 18 is formed along the edge of the lower substrate 11 to have an injection opening 18b by using a sealing material. Further, the spacer 19 for maintaining a cell interval is mounted between the substrates 11 and 17. Thereafter, the lower and upper structure bodies are joined.

After the cell formation, ferrodielectric liquid crystal transiting phases from the chiral nematic (N*) phase to the chiral smectic C (SmC*) phase when in crystalization are injected in a melted state of isotropic liquid state through the injection opening 18b of the cell 18 formed by the sealing material 18a, and then the injection opening 18b of the cell 18 is sealed (Step 130).

Thereafter, a crystalization process for obtaining a chiral smectic phase having the mono domain and the bookshelf structure is carried out.

In the crystalization process, cooling is applied so that the liquid crystal heated over a melting point and injected through the injection opening 18b of the cell 18 can directly transit phases from the chiral nematic (N*) phase to the chiral smectic C (SmC*) phase, and a first dc voltage is applied through the lower and upper electrode layers 12 and 16 (Step 140).

The first dc voltage is applied from the start of cooling or at a liquid crystal temperature several to tens of ° C. higher than a chiral smectic C (SmC*) phase transition temperature. Further, the first dc potential is continuously applied to a second temperature set at a temperature less than a phase transition temperature. Preferably, but not necessarily, a first temperature is a temperature at least 2° C. higher than a phase transition temperature of the ferrodielectric liquid crystal, and the second temperature is a temperature at least one ° C. less than the phase transition temperature.

When the second temperature is reached, the cooling process continues, but the application of the first dc potential stops (Step 150). That is, the cooling continues to reach a third temperature in a state of no potential application. Preferably, but not necessarily, the third temperature is a temperature at least one to two ° C. less than the second temperature.

Lastly, when the third temperature is reached, a second dc voltage of the opposite polarity to that of the first dc potential, namely, a reverse voltage is applied to the electrode layers 12 and 16 until reaching a fourth temperature (Step 160). Preferably, but not necessarily, the fourth temperature is a temperature at least 10° C. less than the third temperature.

The LCD manufactured through such a crystalization process has the liquid crystal layer 14 having the bookshelf structure and the uniform mono domain.

Hereinafter, the LCD manufactured according to the present invention is compared with a liquid crystal display device manufactured by a conventional process through experimental examples for explanations.

First, a ferrodielectric liquid crystal substance directly transiting phases to the chiral smectic C (SmC*) phase through the chiral nematic (N*) phase is described in contrast to the case of the crystalization with only the cooling process of a conventional method.

Figure 6:
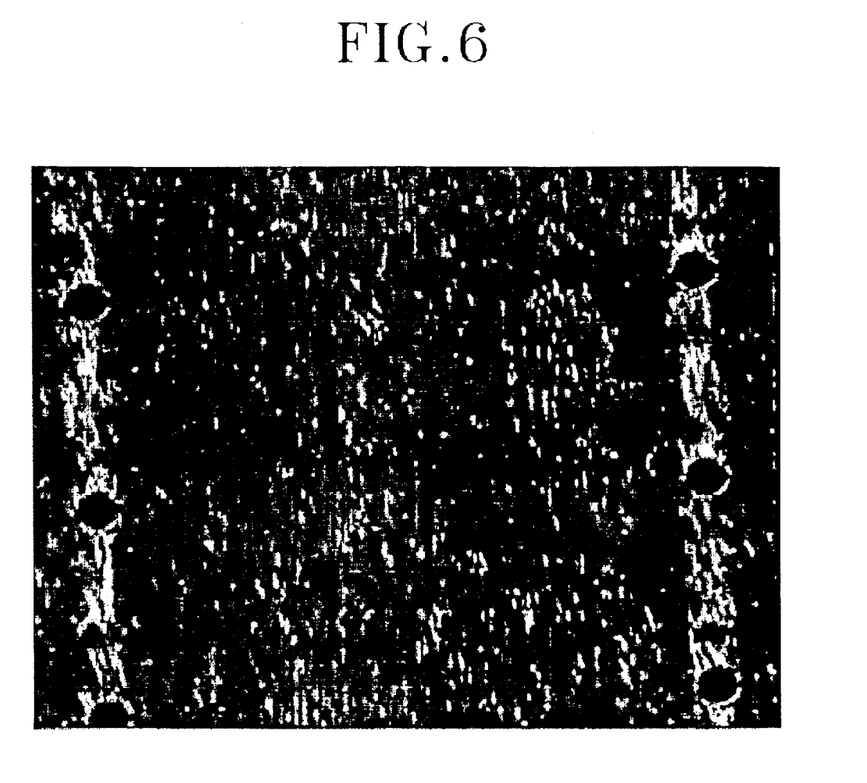
FIG. 6 is a photograph for illustrating a state shown when no potential is applied to a liquid crystal display device produced after cooling with the conventional method of manufacturing a ferrodielectric liquid crystal which transits phases from a chiral nematic (N*) phase to a chiral smectic C phase.

FIG. 6 illustrates a state shown through two polarization plates disposed outside both substrates 11 and 17 and having polarization axes perpendicular to each other with respect to a liquid crystal display device completely produced by cooling a ferrodielectric liquid crystal substance directly transiting phases to the chiral smectic C (SmC*) phase through the chiral nematic (N*) phase to a temperature less than a transition temperature (for example, 72° C.) of the chiral smectic C (SmC*) phase with an application of 2° C. per minute as a cooling rate at the isotropic liquid state.

As shown in FIG. 6, in spite of a black state display mode, the picture partially shows bright portions. The portions shown in circles in FIG. 6 indicate spacers. This results from a non-uniform domain formed in the crystalization process of liquid crystal.

Figure 7:
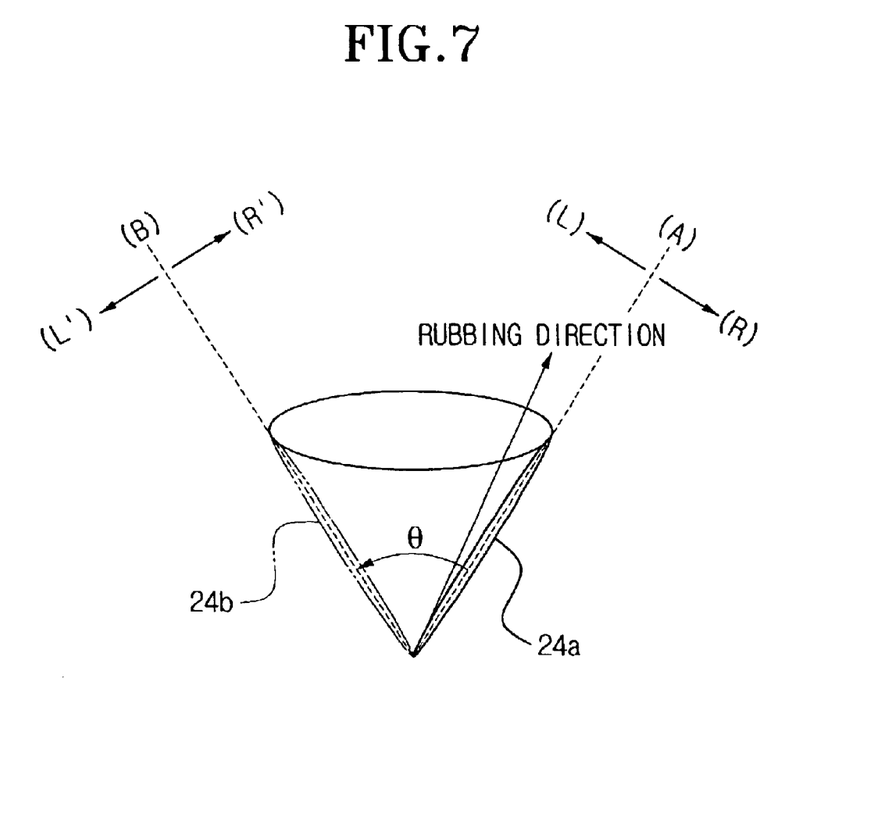
FIG. 7 is a view for schematically showing liquid crystal for an explanation on a process of the crystalization of the ferrodielectric liquid crystal of FIG. 6.

Describing the conventional crystalization process causing such a result with reference to FIG. 7, for example, liquid crystal molecules 24a in a position A tend to move in a left (L) or a right (R) direction to compensate layer contractions while cooling. At this time, most liquid crystal molecules are likely to move in the left (L) direction since the left (L) direction is close to the rubbing direction. However, actually, when undergoing the crystalization process, since an energy difference (ΔE) at a distance from the left (L) direction and the right (R) direction with reference to the liquid crystal 24a at the position A is very small, the liquid crystal molecules 24a are evenly distributed along the left (L) and right (R) directions, to thereby form a non-uniform domain. In this case, the energy difference (ΔE) can be expressed as $\gamma \sin(2\theta)$, the $\gamma$ indicates an anchoring energy with the orientation film of the liquid crystal, and the $\theta$ indicates an rotation angle of the liquid crystal molecules in a rotation cone of the liquid crystal molecules.

A cone locus of the liquid crystal molecules can rotate and is tilted in different directions with the formation of such a non-uniform domain.

In the meantime, in case that a forward dc potential application, application cut-off, and a reverse dc potential application are carried out in order together with cooling in the crystalization process, a liquid crystal display device having a uniform mono domain is manufactured.

Figure 8:
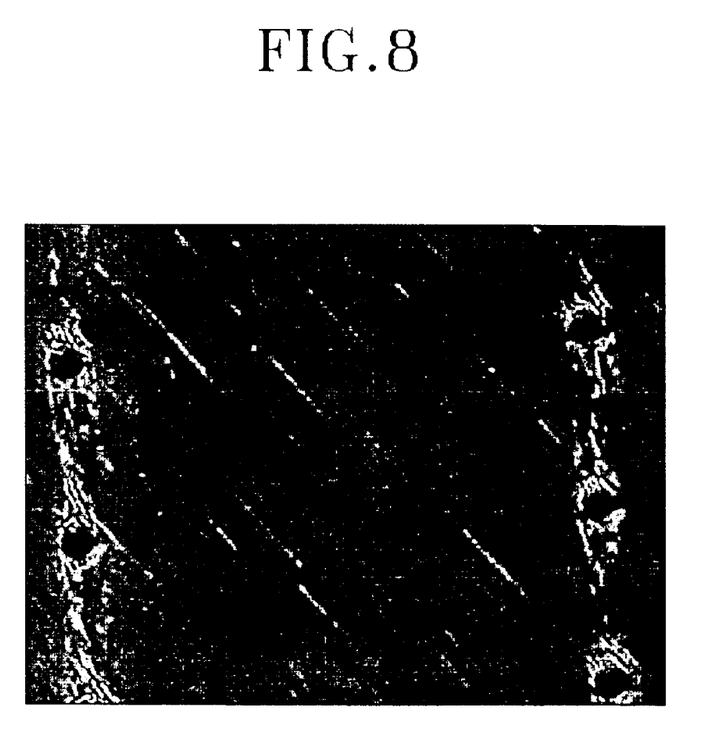
FIG. 8 is a photograph for illustrating a state shown when no potential is applied to a liquid crystal display device produced through a process of manufacturing a liquid crystal display device according to an exemplary embodiment of the present invention.

FIG. 8 is a photograph taken of a state shown through a polarization plate with no voltage application for a block display mode with respect to an FLCD produced through a manufacturing process of the present invention.

As apparent from the photograph, it can be seen that portions having bright differences as shown in FIG. 6 disappear. That is, it can be seen that the liquid crystal display device manufactured according to the present invention is enhanced to a structure having a pure black mono domain. For reference, the liquid crystal display device in the photograph of FIG. 8 has been produced through a process of applying a dc voltage of 8V at temperatures from 74 to 70° C. which are higher than the chiral smectic C phase transition temperature (72° C.), cooling with no potential application at temperatures from 70 to 68° C., and applying a reverse voltage of −8V together with cooling at temperatures from 68 to 30° C. Further, a cell gap was 1.5 μm.

Describing a crystalization process of the LCD of the bookshelf structure having such a uniform mono domain with reference to FIG. 7, for example, since the liquid crystal molecules 24a in the position A forcedly move to a position B and maintain a cone angle at about 45 degrees when cooling due to an applied dc potential, an energy difference ΔE between the left (L') and right (R') directions with reference to liquid crystal molecules 24b in a position B becomes very big, so most liquid crystal molecules are moved and oriented to the right (R') direction close to a rubbing direction, as a result of which it can be determined that a mono domain is formed.

In this case, the magnitude of a dc voltage applied to the liquid crystal layer 14 is preferably, but not necessarily, determined within a proper range according to a cell gap of the liquid crystal layers and the characteristics of a response to a potential applied to the liquid crystal molecules.

As described so far, the FLCD according to the manufacturing method consistent with the present invention can display clear black-and-white states with a liquid crystal layer having a mono domain of the bookshelf structure.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of manufacturing a ferrodielectric liquid crystal display device, comprising:

forming a lower structure body and an upper structure body each having a substrate, an electrode layer, and an orientation film;

forming a cell between the lower and upper structure bodies;

injecting in the cell a predetermined ferrodielectric liquid crystal in a melted state and sealing the cell;

cooling to obtain phase transitions of the ferrodielectric liquid crystal corresponding to a bookshelf structure;

applying a predetermined first dc potential to the electrode layers at temperatures ranging from a first temperature higher than a temperature of the phase transitions to a second temperature below a temperature of the phase transitions;

stopping the application of the first dc potential and cooling to a third temperature lower than the second temperature; and applying to the electrode layers a second dc potential having a polarity opposite to the first dc potential and cooling to a fourth temperature lower than the third temperature.

2. The method as claimed in claim 1, wherein the ferrodielectric liquid crystal is a substance transiting phases from a chiral nematic phase to a chiral smectic C phase upon cooling.

3. The method claimed in claim 1, wherein the first temperature is a temperature at least 2 degrees centigrade higher than the temperature of the phase transitions of the ferrodielectric liquid crystal, and the second temperature is a temperature at least 1 degree centigrade lower than the temperature of the phase transitions.

4. The method claimed in claim 1, wherein the third temperature is at least 1 to 2 degrees centigrade lower than the second temperature.

5. The method as claimed in claim 1, wherein the fourth temperature is at least 10 degrees centigrade lower than the third temperature.

* * * * *